United States Patent
Amano et al.

(10) Patent No.: US 7,695,800 B2
(45) Date of Patent: Apr. 13, 2010

(54) LAYER FORMING RELIEF

(75) Inventors: Masanori Amano, Osaka (JP); Satoru Nishiyama, Osaka (JP)

(73) Assignee: Komura Tech Co., Ltd., Osaka (JP)

( * ) Notice: Subject to any disclaimer, the term of this patent is extended or adjusted under 35 U.S.C. 154(b) by 108 days.

(21) Appl. No.: 10/765,899

(22) Filed: Jan. 29, 2004

(65) Prior Publication Data

US 2004/0185188 A1 Sep. 23, 2004

(30) Foreign Application Priority Data

Feb. 5, 2003 (JP) .............................. 2003-028614

(51) Int. Cl.
*B32B 3/00* (2006.01)
*B32B 3/28* (2006.01)
*B32B 3/30* (2006.01)
*B41N 1/00* (2006.01)

(52) U.S. Cl. ...................... 428/156; 428/167; 101/395; 101/401.1

(58) Field of Classification Search .................. 428/156, 428/167; 101/395, 401.1
See application file for complete search history.

(56) References Cited

U.S. PATENT DOCUMENTS

| 4,152,986 A | 5/1979 | Dadowski et al. |
| 2002/0047560 A1* | 4/2002 | Lee et al. .................. 315/169.3 |
| 2002/0126247 A1 | 9/2002 | Hasegawa et al. |

FOREIGN PATENT DOCUMENTS

| JP | 47-15281 | | 5/1972 |
| JP | 03-061593 | | 3/1991 |
| JP | 2001-076873 A | | 3/2001 |
| JP | 2001-155858 | | 6/2001 |
| JP | 2001-155861 A | | 6/2001 |
| JP | 2001-171066 A | | 6/2001 |
| JP | 2002-056980 A | | 2/2002 |
| JP | 2002-293049 A | | 10/2002 |
| JP | 2002293049 | | 10/2002 |
| JP | 2002293049 A | * | 10/2002 |
| JP | 2003-029271 A | | 1/2003 |
| JP | 2003029271 | | 1/2003 |
| JP | 2003029271 A | * | 1/2003 |

OTHER PUBLICATIONS

The first and final Office Actions issued on Jan. 20, 2009 and Apr. 14, 2009, respectively, on Japanese Patent Application No. 2003-028614 (with English translations).

* cited by examiner

*Primary Examiner*—David R Sample
*Assistant Examiner*—Catherine Simone
(74) *Attorney, Agent, or Firm*—Westerman, Hattori, Daniels & Adrian, LLP (57) ABSTRACT

A layer forming relief transferring and printing an application fluid applied on printing convex portions on a printing object, the layer forming relief including printing convex portions formed as a strip, and a plurality of micro-projections distributed on top faces of the printing convex portions so as to form a groove between adjoining micro-projections for retaining the application fluid.

1 Claim, 6 Drawing Sheets

PRIOR ART

LAYER FORMING RELIEF

BACKGROUND OF THE INVENTION

The present invention relates to a layer forming relief for printing thin layers such as an organic luminous layer in organic electroluminescence (referred to as organic EL hereinafter), a color filter in a liquid crystal panel and a sealing material between glass substrates.

DESCRIPTION OF THE ART

Figure 6:
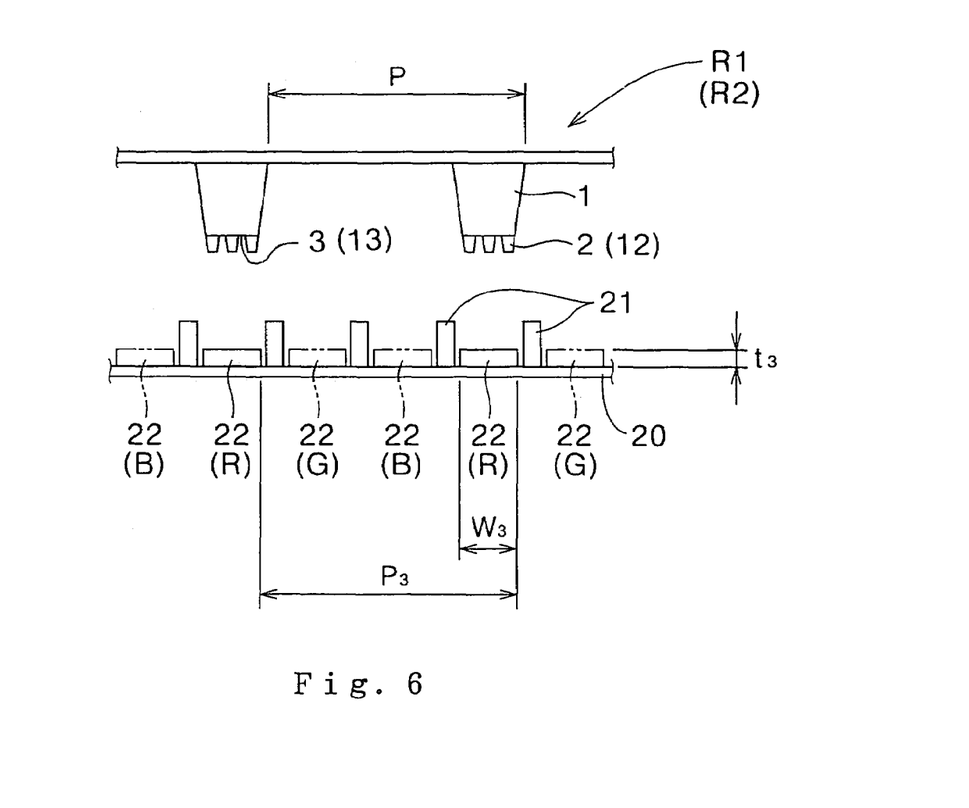
FIG. 6 is a schematic drawing showing the printing method described in FIG. 5.

The surface of a flat glass substrate 20 is usually patterned into small areas with a black matrix 21 in an organic EL color display, and a laminate is formed by laminating an anode, an organic luminous layer 22 and a cathode in this order on the surface of each small area of a glass substrate 20 (see FIG. 6: the anode and cathode are not shown in FIG. 6). A flat sealing body is secured so as to cover the laminate. Layers emitting red (R), green (G) and blue (B) colors are regularly disposed as respective organic luminous layers 22 on each small area (see FIG. 6).

Although the organic luminous layer 22 has been usually formed by a vacuum deposition method or an ink jet method, a printing method that yields high production performance and good workability has been proposed in recent years. Examples of the printing method include a screen printing method, a micro-photogravure coating method and a relief printing method (see, for example, Japanese Unexamined Patent Publication No. 2001-155858).

Figure 8:
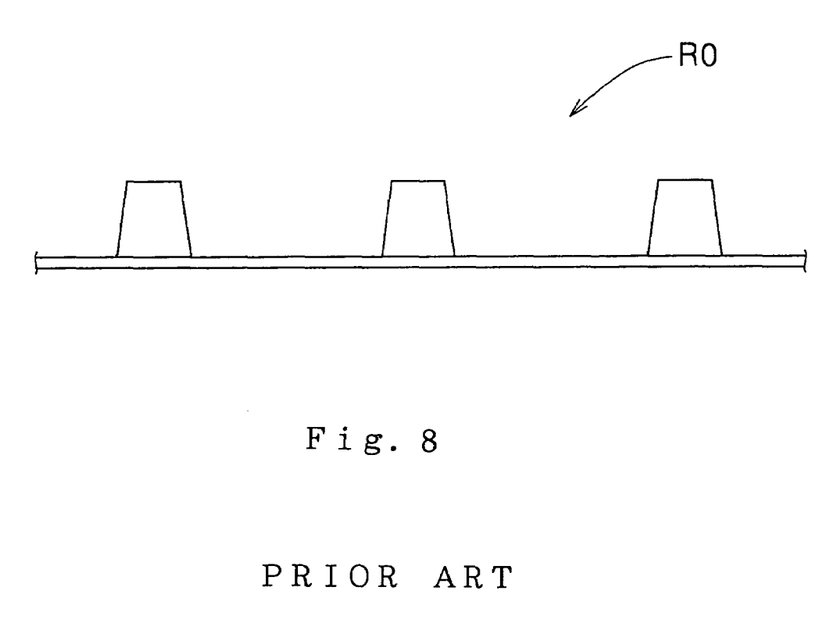
FIG. 8 is a side view showing a conventional relief.

However, the screen printing method is used for forming a relatively thick printing layer, and it is difficult to uniformly form a layer with a thickness of 1 μm or less such as is necessary for permitting the organic luminous layer 22 to efficiently emit a light. Since a metal roll is liable to damage the printing substrate in the micro-photogravure coating method, it is difficult to utilize this method in a manner which will comply with the requirement of a color display having highly precise and fine patterns. Accordingly, printing by the relief printing method has been devised. However, when utilizing this method the organic luminous layer 22 becomes too thin. Even when using a standard relief (R0) as shown in FIG. 8 it is difficult to print the organic luminous layer 22 with enough thickness to obtain high luminous efficiency, or to print a highly precise and fine pattern.

Such situations are encountered not only in printing the organic luminous layer 22, but also in printing other thin layers such as the color filter in the liquid crystal panel and sealing material between the glass substrates.

SUMMARY OF THE INVENTION

Accordingly, it is an object of the present invention, taking these situations into consideration, to provide a layer forming relief that is able to print a layer with a desired thickness while enabling a highly precise and fine pattern to be printed.

The present invention provides a layer forming relief to be used for transferring and printing an application fluid applied on printing convex portions on a printing object. In a first aspect, the layer forming relief comprises the printing convex portions formed as a strip, and a plurality of micro-projections is formed so as to be distributed on top faces of the printing convex portions so as to form a groove between adjoining micro-projections for retaining the application fluid. In a second aspect, the layer forming relief comprises a plurality of projected micro-stripes formed so as to be distributed to form grooves for retaining the application fluid between adjoining projected micro-stripes.

The inventors of the present invention have made intensive studies on the configuration of the printing convex portions of the layer forming relief for forming layers by relief printing, in order to print the layer with a desired thickness while enabling a highly precise and fine pattern to be printed. It was found in the process of the study that the application fluid is retained in the grooves formed between adjoining micro-projections or projected micro-stripes, by forming strips of the printing concave portions, and by forming a plurality of micro-projections or projected micro-stripes so as to be distributed on the top face of the printing convex portions so that the layer can be formed with a desired thickness and a highly precise and fine pattern, thereby attaining the present invention.

DESCRIPTION OF THE PREFERRED EMBODIMENTS

The aspects of the present invention will be described in detail hereinafter with reference to the drawings.

Figure 1:
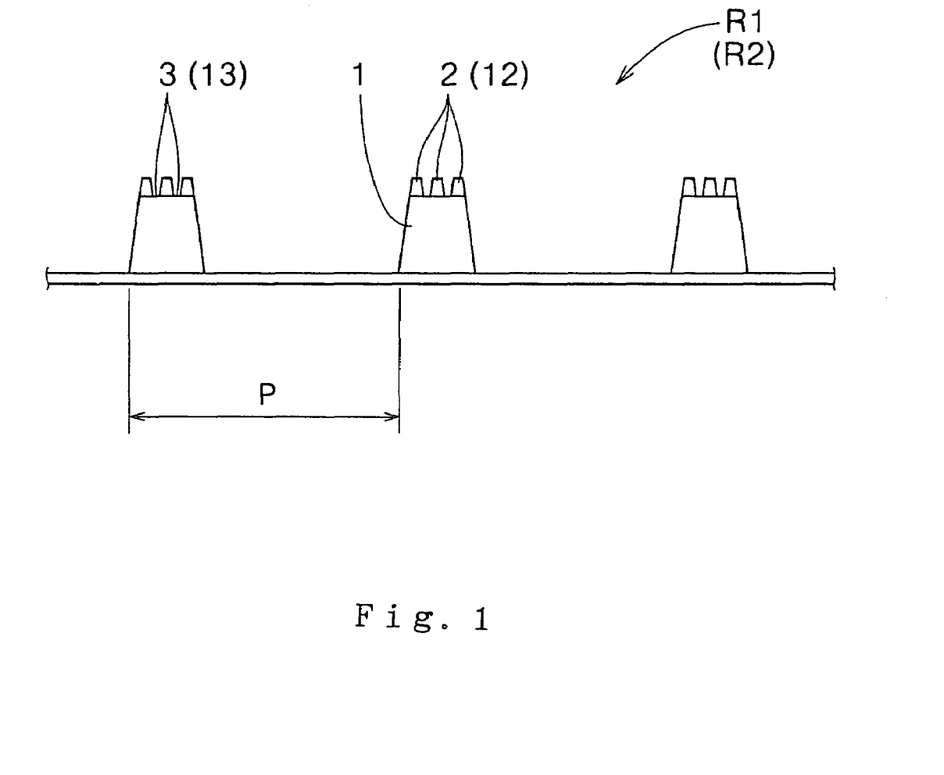
FIG. 1 is a side view showing one aspect of the layer forming relief according to the present invention.
Figure 2:
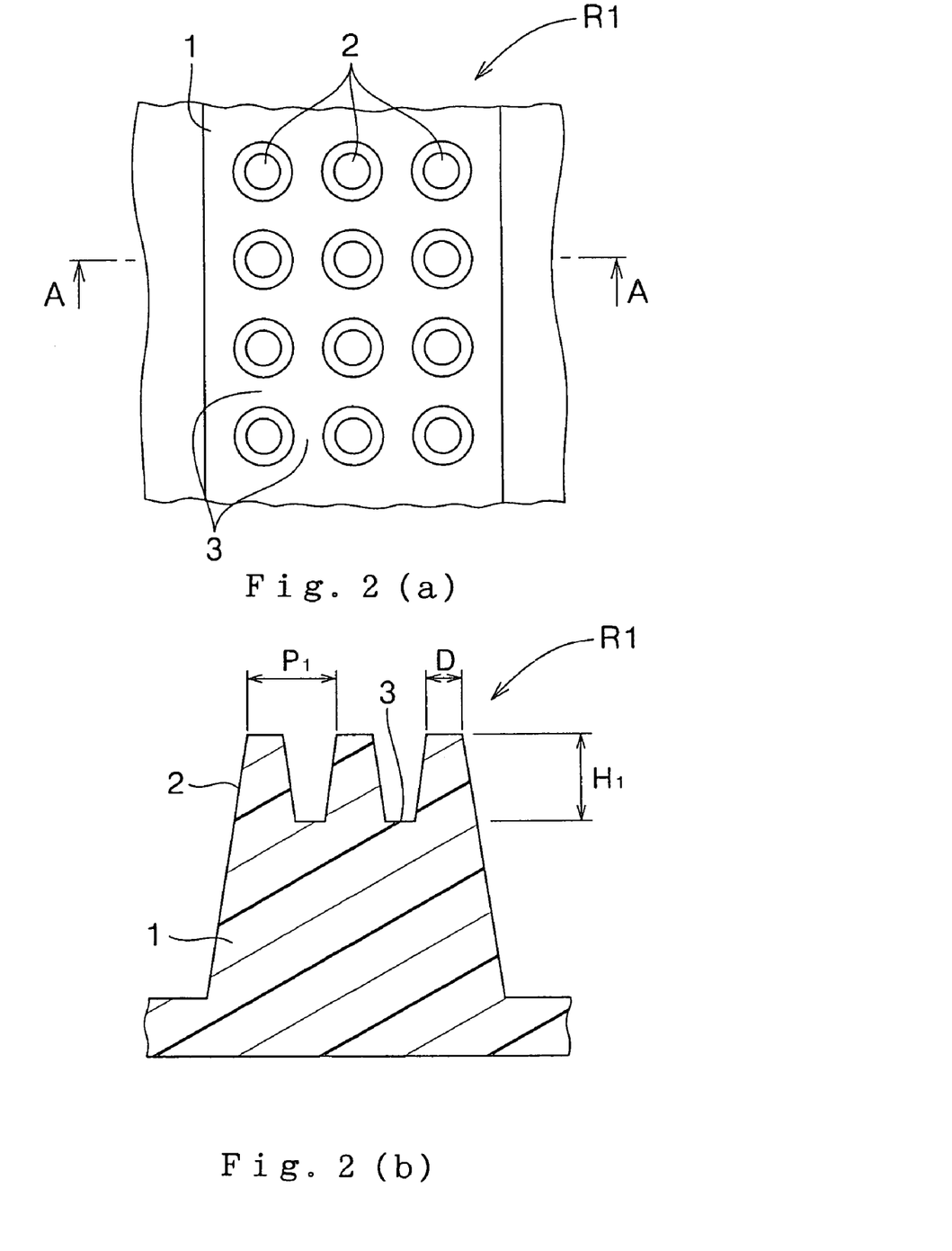
FIG. 2(a) is a plane view showing the main part of one aspect of the layer forming relief according to the present invention.
FIG. 2(b) is a cross section of the layer forming relief along the line A-A in FIG. 2(a)

FIGS. 1, 2(a) and 2(b) illustrate one aspect of the layer forming relief according to the present invention. In this aspect, the layer forming relief R1 is used for printing three colors (red, green and blue) of organic luminous layers 22 (see FIG. 6). The printing convex portions 1 formed on the surface of the layer forming relief R1 are formed as strips disposed in parallel with a given pitch (space) P. A plurality of micro-projections 2 are formed so as to be distributed on the top face of the printing convex portion 1, and grooves 3 are formed between the adjoining micro-projections 2. The organic luminous layer 22 comprises an organic luminous substance (application fluid), and is formed by printing the organic luminous substance. For printing the organic luminous layer 22 as described in this aspect, the organic luminous substance is retained in the grooves 3 between the adjoining micro-projections 2.

This aspect will be described in more detail. The organic luminous layers 22 of respective colors are formed into strips aligned in a parallel relation with each other with a given space, and the layers with red (R), green (G) and blue (B) colors are repeatedly disposed in this order (see FIG. 6). One sheet of the layer forming relief R1 is used for printing one color of the organic luminous layer 22 (see FIG. 6). Accordingly, one printing relief is provided for each color of the organic luminous layer 22. In other words, the pitch for providing the printing convex portions 1 matches the pitch $P_3$ for providing each color of the organic luminous layer 22. The pitch P for providing the printing convex portions 1 also matches the width of one pixel as a set of red (R), green (G) and blue (B) organic luminous layers 22. The width of the pixel usually tends to be large as the size of the organic EL color display is larger, and it is in the range of 300 to 1000 μm.

Low molecular weight luminous substances and polymer materials are used for controlling the viscosity of the organic luminous substance in the range of 50 to 100 mPa·s. Examples of the low molecular weight luminous substances include triphenylbutadiene, coumarin, nile red and oxadiazole derivatives. Examples of the polymer materials include poly(2-decyloxy-1,4-phenylene) (DO-PPP), poly[2-(2'-ethylhexyloxy)-5-methoxy-1,4-phenylenevinylene] (MEH-PPV), poly[5-methoxy-(2-propanoxysulfonide)-1,4-phenylenevinylene] (MPS-PPV), poly[2,5-bis(hexyloxy-1,4-phenylene)-(1-cyanovinylene)] (CN-PPV), poly[2-(2'-ethylhexyloxy)-5-methoxy-1,4-phenylene-(1-cyanovinylene)] (MEH-CN-PPV), and poly(dioctylfluorene). Examples of the solvents to be used for these materials include cyclohexylbenzene, trichlorobenzene, anisole, xylene, ethyl benzoate, cyclohexylpyrrolidone, butyl cellosolve, dichlorobenzene and toluene. These solvents may be used alone, or as a mixture of at least two of them. The mixing ratio is determined depending on the organic luminous layer 22.

While the shape of the micro-projections 2 is not particularly restricted, it is preferably a truncated cone or a cylinder (the shape is a truncated cone in FIG. 2(b)). When using the organic luminous substance having the above-mentioned viscosity, it is also preferable for improving transferability that the height $H_1$ of the micro-projection 2 is in the range of 2 to 50 μm, the diameter D of the top face of the micro-projection 2 is 5 μm or more, the space $P_1$ between the adjoining micro-projections 2 is 7 μm or more, and the number of the micro-projections formed so as to be distributed in the transverse direction of the top face of the printing convex portions 1 is in the range of 2 to 30 (e.g. 3 in FIGS. 2(a) and 2(b)).

Figure 3:
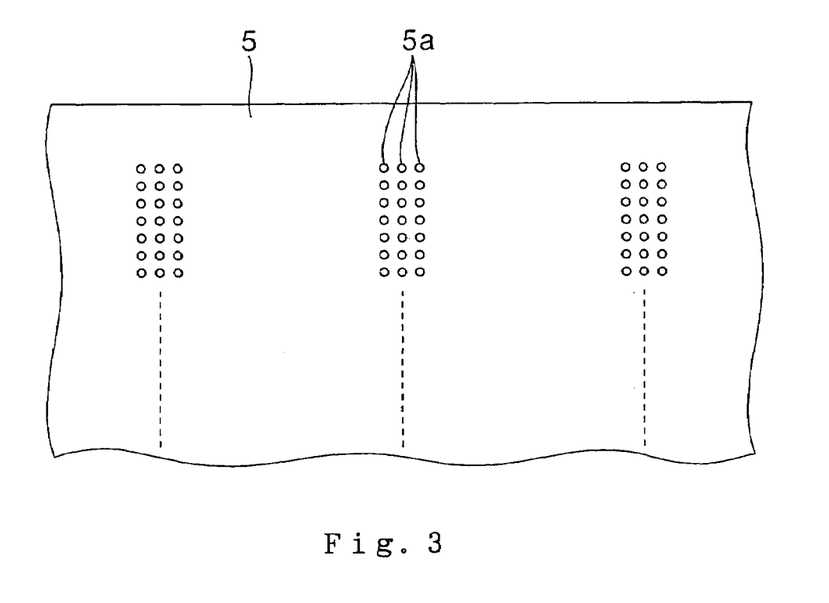
FIG. 3 is a plane view of the negative film used for manufacturing the layer forming relief according to the present invention.
Figure 4:
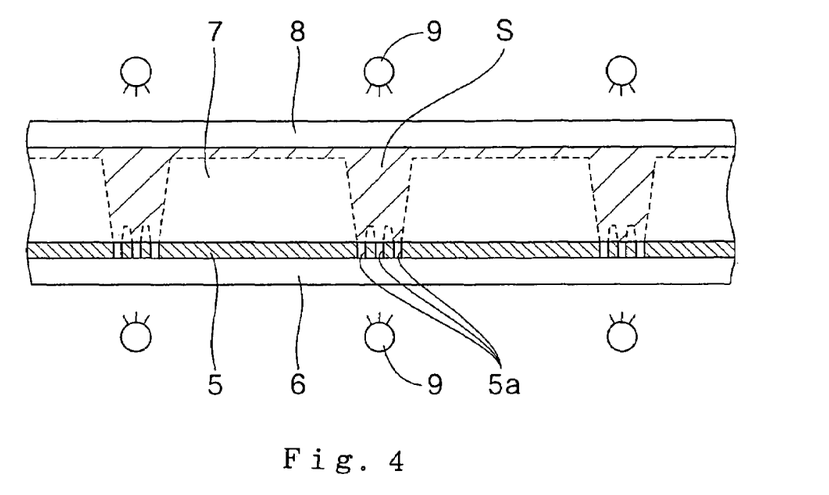
FIG. 4 is an illustrative drawing showing the method for manufacturing the layer forming relief according to the present invention.

The layer forming relief R1 as described above can be manufactured as follows. At first, a negative film 5 as shown in FIG. 3 is prepared. In the negative film 5, the internal area contains transparent circles 5a, each circle corresponding to each micro-projection 2 of the layer forming relief R1, and the area out of the circle is black. After laminating the negative film 5 on the surface of a glass plate 6 as shown in FIG. 4, a liquid photo-curing resin 7 is coated on the surface of the negative film 5 with a given thickness, a transparent base film (not shown) is laminated on the surface comprising the liquid photo-curing resin 7, and a glass plate 8 is laminated on the surface of the base film. Then, an ultraviolet (UV) light is irradiated through the upper glass plate 8 and base film using lamps 9, and also through the lower glass plate 6 and negative film 5. As a result, the portions where the light enters through the entire surface of the layer comprising the liquid photo-curing resin 7, and the portions where the light enters through the internal area of the transparent circle 5a on the negative film 5 (the portions with oblique lines in FIG. 4) are cured. The depth of reach of the light is adjusted by the intensity of the irradiated light. Subsequently, the upper and lower glass plates 8 and 6, and the negative film 5 are removed, and the uncured portions where the light did not reach due to the black portions on the negative film 5 is removed by washing. The cured portions are dried, and fine lines are reliably cured by irradiation (post-irradiation) of a light such as a UV light at the side where the micro-projections 2 are formed, thereby manufacturing the layer forming relief R1 as shown in FIG. 1.

The liquid photo-curing resin 7 is not particularly restricted in manufacturing the layer forming relief R1, and any resins known in the art may be used. Examples thereof include those prepared by adding a photopolymerization initiator, and/or photosensitizer and/or heat stabilizer into an unsaturated polyester resin or polybutadiene, or those prepared by adding the photosensitizer or heat stabilizer into an unsaturated resin in which unsaturated groups are introduced into a prepolymer such as acrylic, urethane, epoxy or polyester prepolymer. The photo-curing resin is not restricted to the liquid resin, and a solid resin such as a resin plate may be used. Examples of the liquid resin include APR (made by Asahi Kasei Corporation), and examples of the solid resin include AFP (made by Asahi Kasei Corporation), TEVISTA (made by Teijin Ltd.), CYREL (made by Du Pont de Nemours and Company) and ELASLON (made by Tokyo Ohka Kogyo Co. Ltd.).

While characteristic patterns of the printing convex portions 1 and micro-projections 2 may be formed by properly adjusting the transparent portions and black portions on the negative film 5 into desired patterns, such negative film 5 may be manufactured into a desired pattern using an image setter (image processor) for film exposure.

Figure 5:
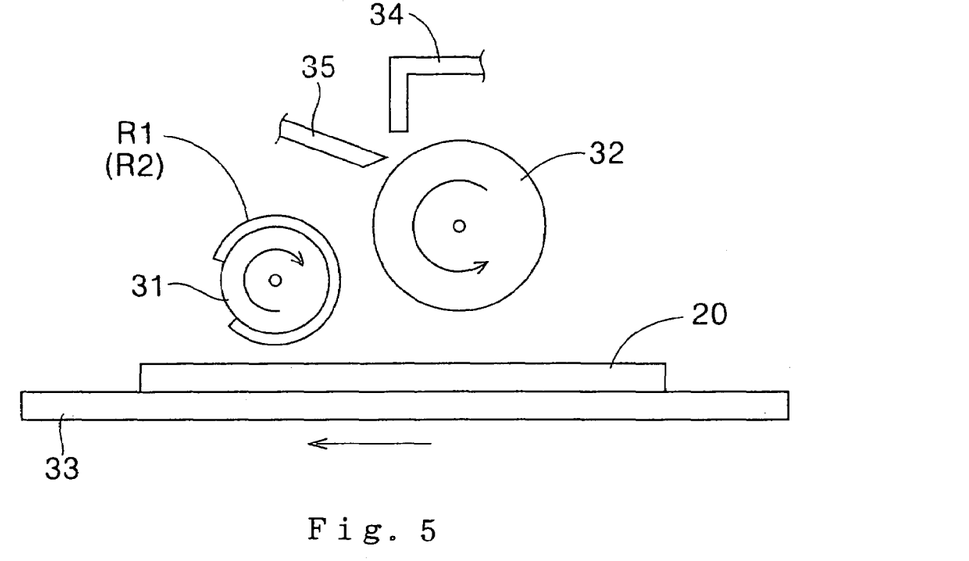
FIG. 5 is provided for describing the method for printing the organic luminous layer by using the layer forming relief according to the present invention.

The organic luminous layer 22 can be printed by a conventional relief printing method using the layer forming relief R1 manufactured as described above. As shown in FIG. 5, a printer used comprises a printing roll (printing cylinder) 31, an anilox roll 32, a printing stage (printing table) 33, an organic luminous substance feeder 34 and a doctor 35 for scraping excess organic luminous substance on the anilox roll 32. Then, the layer forming relief R1 is attached to the printing roll 31, and the glass substrate (printing object) 20, which is patterned by the black matrix (not shown in FIG. 5) and on which the electrodes (not shown) are formed, is mounted on the printing stage 33. Subsequently, one color (for example red) of the organic luminous substance is fed from the organic luminous substance feeder 34 onto the anilox roll 32, and the printing roll 31 and anilox roll 32 are allowed to rotate. The organic luminous substance is retained in the groove 3 between adjoining micro-projections 2 on the surface of the layer forming relief R1 (see FIG. 2). Then, the printing stage 33 is allowed to move in synchronization with rotation of the printing roll 31. Such printing process is repeated for the other two colors, thereby printing the three color organic luminous layers 22 on respective prescribed positions. FIG. 6 is a schematic plane view of the printing process (the electrodes are not shown in FIG. 6).

The plural micro-projections 2 are formed so as to be distributed on the top face of the printing convex portions 1 on the layer forming relief R1 for the printing process, wherein the grooves 3 are formed between the adjoining micro-projections 2 so that the organic luminous substance is retained in the groove 3. Consequently, the organic luminous layer 22 can be printed with a desired thickness while enabling the printed pattern to be highly precise and fine.

Figure 7A:
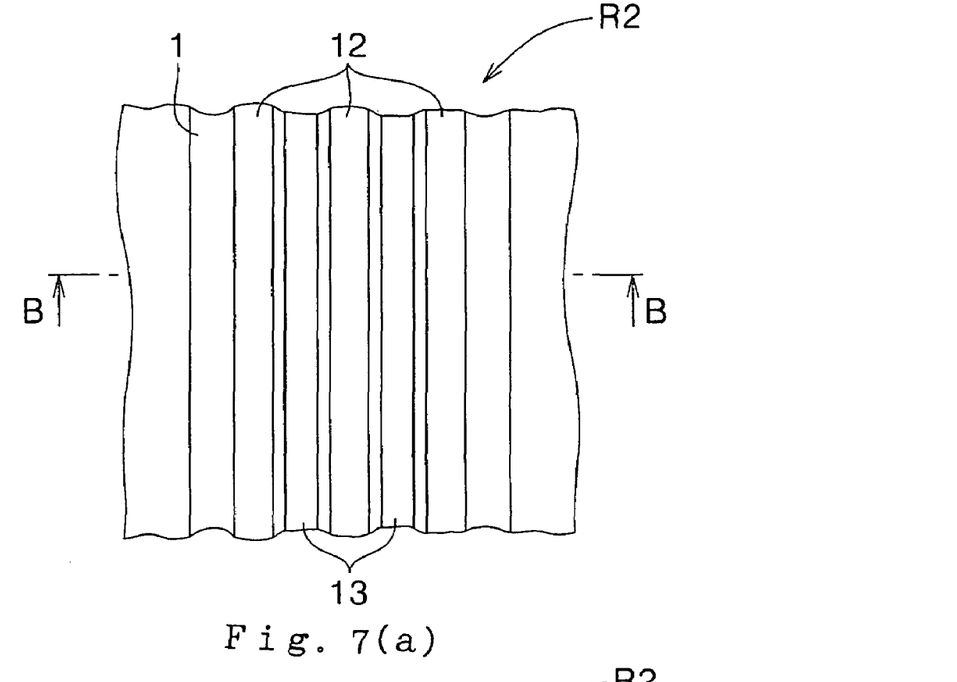
FIG. 7(a) is a plane view showing the main part of another aspect of the layer forming relief according to the present invention.
Figure 7B:
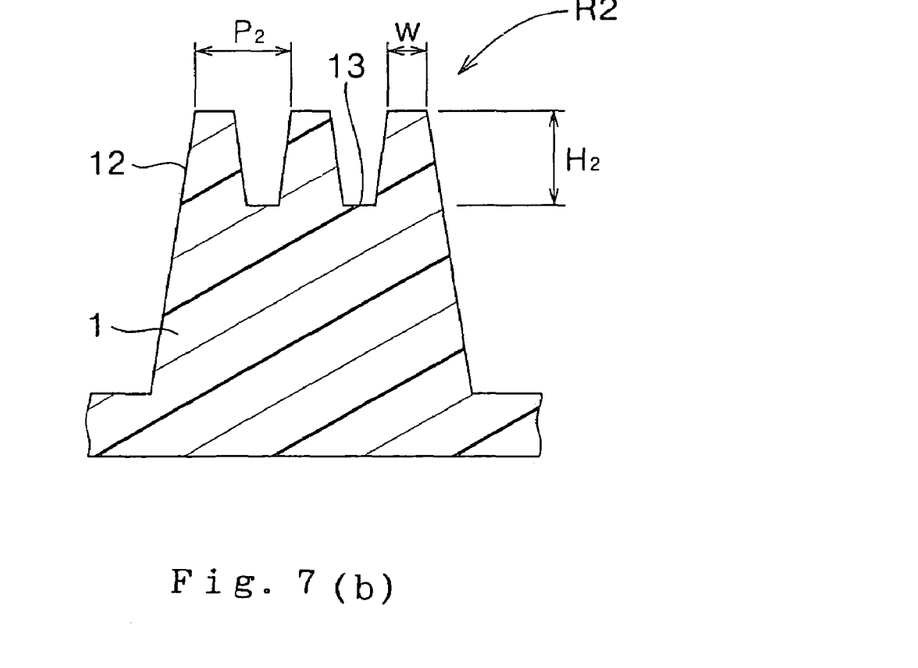
FIG. 7(b) is a cross section of the layer forming relief along the line B-B in FIG. 7(a).

FIG. 1 and FIGS. 7(a) and 7(b) show another aspect of the layer forming relief according to the present invention. Plural projected micro-stripes 12 are formed so as to be distributed on the top face of the printing convex portions 1 of the layer forming relief 2, and a groove 13 is formed between the adjoining projected micro-stripes 12. The longitudinal direction of the projected micro-stripe 12 is made to be parallel to the longitudinal direction of the strip of the printing convex portions 1.

While the shape of the projected micro-stripes 12 is not particularly restricted, it is preferable that the cross section perpendicular to the longitudinal direction is a trapezoid or rectangle (the shape is trapezoid in FIG. 7B). Preferably, the height $H_2$ of the projected micro-stripe 12 is in the range of 2 to 55 μm, the width W of the top face of the projected micro-stripe 12 is 3.5 μm or more, the space $P_2$ between the adjoining projected micro-stripes 12 is 7 μm or more, and the number of the projected micro-stripes 12 formed so as to be distributed in the transverse direction on the top face of each printing convex portion is in the range of 2 to 33 (e.g. 3 in FIG. 7(a)) for improving transferability when using the organic luminous substance having the above-mentioned viscosity. The other parts are the same as those in the foregoing aspect, and the same reference numerals are given to the similar portions.

The layer forming relief R2 as described above can be manufactured by forming the transparent portions of the negative film 5 (see FIG. 3) into a strip corresponding to the projected micro-stripes 12 in the manufacturing process of the layer forming relief R1 in the first aspect.

The organic luminous layer 22 may be printed, as in the first aspect, using the layer forming relief R2 with a desired thickness as well as a highly precise and fine pattern of the organic luminous layer 22.

In the aspects as hitherto described, the layer forming reliefs R1 and R2 are preferably mounted so that the longitudinal direction of the strip of the printing convex portions 1 matches the circumference direction of the printing roll 31 (or becomes perpendicular to the direction of rotation axis), in order to obtain better transferability. However, the mounting direction is not restricted thereto, and any other directions may be employed.

While the liquid photo-curing resin 7 is used for the material of the layer forming reliefs R1 and R2 in the aspects described above, the resin is not restricted thereto so long as the application fluid is able to be printed as hitherto described, and other materials may be used.

A base film layer, an adhesive layer comprising pressure sensitive adhesive and the like, and a metal plate or a synthetic resin plate may be laminated in this order on the opposed face (back face) to the face for forming the printing convex portions in the layer forming reliefs R1 and R2 in each aspect as hitherto described. Using the layer forming reliefs R1 and R2 having the construction as described above allows a cupping phenomenon (a phenomenon in which the peripheral area of the layer forming reliefs R1 and R2 is formed with a larger thickness than the central area) to hardly occur, thereby effectively suppressing a marginal phenomenon (a phenomenon in which the thickness of the peripheral portion of the organic luminous layer 22 increases).

While the layer forming reliefs R1 and R2 for printing the organic luminous layer 22 have been described in the foregoing aspects, the reliefs may be used for other purposes, wherein the application liquid is not necessarily the organic luminous substance with no restrictions thereon. The printing object for the purpose above is not restrictive, and may be a glass plate, a metal foil, metal plate, plastic plate, plastic sheet, knit or woven fabrics, nonwoven fabrics or paper depending on the kind of application fluid. However, a glass plate, metal foil and metal plate are preferable from the view point that the transferred application fluid is hardly absorbed.

While the relief for printing the organic luminous layer 22 for the organic EL color display has been described as the layer forming relief according to the present invention, the same function and effect will be manifested with respect to the relief for printing a thin layer such as a color filter and a sealing agent between the glass substrate for a liquid crystal panel.

Examples of the present invention will be described hereinafter.

EXAMPLE 1

A layer forming relief R1 as shown in FIG. 1 was prepared by the same method as hitherto described using a liquid photo-curing resin (APR made by Asahi Kasei Corporation) 7 as the material for the layer forming relief R1. The dimensions of the micro-projection 2 and other members of the layer forming relief R1 were as follows:

micro-projection 2:
  height $H_1$=5 μm
  diameter of the top face=15 μm
  space $P_1$ between adjoining micro projections 2=27.5 μm
  number of micro-projections 2 formed so as to be distributed on the top face of each printing convex portion 1=3
  total stripe width=70 μm (=27.5×2+15)

printing convex portion 1:
  distribution pitch=300 μm

The printer used (made by Nihon Photo-Printer Co.) is shown in FIG. 5. The anilox roll 32 of this printer was a 300L pyramid type with a nip width of 15 mm. The organic luminous substance used had a viscosity of 75 mPa·s. The printing object prepared was a glass substrate 20 (see FIG. 6) on which electrodes (not shown) were formed by patterning with a black matrix 21.

The organic luminous layer 22 was printed on the electrodes (not shown) on the glass substrate 20 by using the layer forming relief R1, the printer and the organic luminous substance, as shown in FIG. 6. As a result, the organic luminous layer 22 was printed with a thickness $t_3$ of 1250 Å, a width $W_3$ of 80 μm and a distribution pitch $P_3$ of 300 μm, showing that the organic luminous layer 22 can be printed with a desired thickness with a highly precise and fine pattern.

According to the layer forming relief of the present invention, the printing convex portions are formed into a strip with a plurality of micro-projections or projected micro-stripes on the top face of the printing convex portions. Consequently, grooves for retaining the application fluid are formed between the adjoining micro-projections or projected micro-stripes. Therefore, a layer printed by a conventional relief printing method utilizing the present invention can have a desired thickness with a highly precise and fine pattern.

In the present invention, especially, in the case that the micro-projections are formed into a conical or cylindrical a truncated cone or a cylinder shape, and the height of the micro-projections is in the range of 2 to 50 μm, the diameter of the top face of the micro-projection is 5 μm or more, the space between the adjoining micro-projections is 7 μm or more, and the number of the micro-projections formed so as to be distributed in the width direction of the top face of the printing convex portion is in the range of 2 to 30, the suitable viscosity of an organic luminous substance as an application fluid is in the range of 50 to 100 mPa·s, results in good transferability. Accordingly, the organic luminous layer for the organic EL can be printed with a desired thickness with a highly precise and fine pattern by using this layer forming relief.

Similarly, in the case that the cross section of the projected micro-stripe in the direction perpendicular to the longitudinal direction is formed into a trapezoid or rectangle with the height of the micro-projection in the range of 2 to 55 µm, the width of the top face of the micro-projection of 3.5 µm or more, the space between the adjoining micro-projections of 7 µm or more, and the number of the projected micro-stripes formed so as to be distributed in the width direction of the printing convex portion is in the range of 2 to 33 µm, the suitable viscosity of an organic luminous substance as an application fluid is in the range of 50 to 100 mPa·s, results in transferability. Accordingly, the organic luminous layer for the organic EL can be printed with a desired thickness with a highly precise and fine pattern by using the layer forming relief.

Furthermore, the printing relief is suitable for printing the organic luminous layer for the organic EL in the present invention, when the printing convex portions formed as a strip are arranged to be parallel with each other with a prescribed space.

What is claimed is:

1. A layer forming relief capable of transferring and printing an organic luminous substance having a viscosity in the range of 50 to 100 mPa·s applied on top faces of printing convex portions on a printing object, the layer forming relief comprising:

the printing convex portions formed as linear strips and aligned to be parallel with each other with a pitch, and a plurality of projected micro-stripes distributed on the top faces of each of the printing convex portions so as to form a groove between adjoining micro-stripes for retaining the organic luminous substance, wherein a cross section of the projected micro-stripes in a direction perpendicular to a longitudinal direction is trapezoidal or rectangular, wherein the height of the projected micro-stripe is in the range of 2 to 55 µm, the width of the top face of the projected micro-stripe is 3.5 µm or more, the space between the adjoining projected micro-stripes is 7 µm or more, and the number of the projected micro-stripes is in the range of 2 to 33 and is formed so as to be distributed in the width direction of the top face on the printing convex portion, and wherein said pitch of said printing convex portions matches a width of one pixel printed on the printing object.

* * * * *